(12) United States Patent
Lyubomirsky

(10) Patent No.: US 10,374,709 B2
(45) Date of Patent: Aug. 6, 2019

(54) CHROMATIC DISPERSION MANAGEMENT

(71) Applicant: Facebook, Inc., Menlo Park, CA (US)

(72) Inventor: Ilya Lyubomirsky, Pleasanton, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/655,795

(22) Filed: Jul. 20, 2017

(65) Prior Publication Data

US 2019/0028198 A1  Jan. 24, 2019

(51) Int. Cl.
*H04J 14/02* (2006.01)
*H04B 10/2513* (2013.01)
*H04B 10/516* (2013.01)
*H04B 10/61* (2013.01)

(52) U.S. Cl.
CPC ..... *H04B 10/2513* (2013.01); *H04B 10/5161* (2013.01); *H04B 10/612* (2013.01); *H04B 10/6161* (2013.01); *H04J 14/0201* (2013.01)

(58) Field of Classification Search
CPC ............ H04B 10/2513; H04B 10/5161; H04B 10/612; H04B 10/6161; H04J 14/0201
USPC ........................................................ 398/79
See application file for complete search history.

(56) References Cited

U.S. PATENT DOCUMENTS

| | | | |
|---|---|---|---|
| 5,629,836 A | 5/1997 | Wright et al. | |
| 5,729,752 A | 3/1998 | Snider et al. | |
| 5,997,326 A | 12/1999 | Koradia et al. | |
| 6,373,713 B1 | 4/2002 | Jensen et al. | |
| 6,381,146 B1 | 4/2002 | Sevier et al. | |
| 6,422,876 B1 | 7/2002 | Fitzgerald et al. | |
| 6,637,846 B2 | 10/2003 | Yang et al. | |
| 6,814,582 B2 | 11/2004 | Vadasz et al. | |
| 7,050,307 B2 | 5/2006 | Doblar et al. | |
| 7,092,642 B2 | 8/2006 | Way et al. | |
| 7,435,095 B1 | 10/2008 | Yi et al. | |
| 8,154,867 B2 | 4/2012 | Shearman et al. | |
| 9,136,624 B1 | 9/2015 | Reynov et al. | |
| 9,584,217 B2 * | 2/2017 | Bottari | H04B 10/0775 |
| 9,686,886 B2 | 7/2017 | Okada et al. | |
| 2003/0080568 A1 | 5/2003 | Busby et al. | |
| 2004/0002237 A1 | 1/2004 | Doblar et al. | |
| 2004/0047128 A1 | 3/2004 | McClelland, II et al. | |
| 2005/0207134 A1 | 9/2005 | Belady et al. | |
| 2006/0049727 A1 | 3/2006 | Corsini et al. | |
| 2006/0121421 A1 | 6/2006 | Spitaels et al. | |
| 2007/0184676 A1 | 8/2007 | Minich et al. | |

(Continued)

OTHER PUBLICATIONS

U.S. Appl. No. 15/725,239 by Taylor, J., et al., filed Oct. 4, 2017.

(Continued)

*Primary Examiner* — Tesfaldet Bocure
(74) *Attorney, Agent, or Firm* — Van Pelt, Yi & James LLP

(57) ABSTRACT

Optical fiber data communications are described. A controller can determine chromatic dispersion of an optical signal that is to be demodulated using coherent detection. The controller can then determine the chromatic dispersion of another optical signal that is to be demodulated using direct detection. The chromatic dispersion of the other optical signal can then be adjusted to account for chromatic dispersion experienced by the other optical signal when it propagated through an optical fiber.

20 Claims, 4 Drawing Sheets

(56) References Cited

U.S. PATENT DOCUMENTS

| | | | |
|---|---|---|---|
| 2008/0294968 A1* | 11/2008 | Djordjevic | H03M 13/1111 714/801 |
| 2011/0013348 A1 | 1/2011 | Seibold et al. | |
| 2012/0120596 A1 | 5/2012 | Bechtolsheim et al. | |
| 2013/0337665 A1 | 12/2013 | Cohen et al. | |
| 2014/0098492 A1 | 4/2014 | Lam et al. | |
| 2014/0206273 A1 | 7/2014 | Larsen et al. | |
| 2014/0307400 A1 | 10/2014 | French et al. | |
| 2014/0362874 A1 | 12/2014 | Nishimoto | |
| 2015/0229438 A1 | 8/2015 | Le Taillandier De Gabory et al. | |
| 2016/0077556 A1 | 3/2016 | Yang et al. | |
| 2016/0119078 A1* | 4/2016 | Kakande | H04J 14/06 398/65 |
| 2016/0128230 A1 | 5/2016 | Dogruoz et al. | |
| 2016/0197679 A1 | 7/2016 | Takahara et al. | |
| 2017/0245030 A1 | 8/2017 | Lyubomirsky | |
| 2017/0329371 A1 | 11/2017 | Schmidtke et al. | |
| 2017/0331766 A1 | 11/2017 | Schmidtke et al. | |
| 2017/0332506 A1 | 11/2017 | Schmidtke et al. | |
| 2017/0332518 A1 | 11/2017 | Schmidtke et al. | |
| 2017/0332519 A1 | 11/2017 | Schmidtke et al. | |
| 2018/0294913 A1* | 10/2018 | Chen | H04J 14/0227 |

OTHER PUBLICATIONS

Non-Final Office Action dated Aug. 29, 2017 for U.S. Appl. No. 15/291,293 by Schmidtke, H., et al., filed Oct. 12, 2016.

Non-Final Office Action dated Jun. 15, 2017 for U.S. Appl. No. 15/338,255 by Lyubomirsky, I., et al., filed Oct. 28, 2016.

Notice of Allowance dated Jul. 3, 2017 of U.S. Appl. No. 15/291,313 of Schmidtke H., et al., filed Oct. 12, 2016.

U.S. Appl. No. 15/291,263 by Schmidtke, H. et al., filed Oct. 12, 2016.

U.S. Appl. No. 15/291,293 by Schmidtke, H. et al., filed Oct. 12, 2016.

U.S. Appl. No. 15/291,313 by Schmidtke, H. et al., filed Oct. 12, 2016.

U.S. Appl. No. 15/291,324 by Schmidtke, H. et al., filed Oct. 12, 2016.

U.S. Appl. No. 15/291,348 by Schmidtke, H. et al., filed Oct. 12, 2016.

U.S. Appl. No. 15/338,255 by Lyubomirsky, I., et al., filed Oct. 28, 2016.

U.S. Appl. No. 15/705,205 by Schmidtke, H. et al. filed Sep. 14, 2017.

U.S. Appl. No. 15/706,561 by Schmidtke, H. et al. filed Sep. 15, 2017.

U.S. Appl. No. 15/716,454 by Schmidtke, K. filed Sep. 26, 2017.

Corrected Notice of Allowability dated Nov. 21, 2017 for U.S. Appl. No. 15/291,313 by Schmidtke, H., et al., filed Oct. 12, 2016.

European Perforators Association "The Advantages of Perporated Metals" Aug. 21, 2016, EUROPERF.

Non-Final Office Action dated Nov. 17, 2017 for U.S. Appl. No. 15/291,348 by Schmidtke, H., et al., filed Oct. 12, 2016.

Non-Final Office Action dated Nov. 24, 2017 for U.S. Appl. No. 15/291,263 by Schmidtke, H., et al., filed Oct. 12, 2016.

Notice of Allowance dated Dec. 6, 2017 for U.S. Appl. No. 15/291,293 by Schmidtke, H., et al., filed Oct. 12, 2016.

* cited by examiner

CHROMATIC DISPERSION MANAGEMENT

TECHNICAL FIELD

This disclosure relates to chromatic dispersion management for optical fiber data communications.

BACKGROUND

Optical fiber data communications systems can use dense wavelength division multiplexing (DWDM) to simultaneously transmit optical signals at different wavelengths on a single optical fiber. The optical fiber data communications systems can detect these transmitted optical signals as information using direct detection or coherent detection. With coherent detection, intensity, phase, and/or frequency of the optical signal can be used to recover information provided by the optical signals. With direct detection, only the intensity of the optical signals is used to recover the information.

An optical fiber data communications system implementing intensity modulation with direct detection can have lower power requirements, have a smaller size, and have a reduced cost in comparison with an optical fiber data communications system implementing coherent detection.

DETAILED DESCRIPTION

Figure 1:
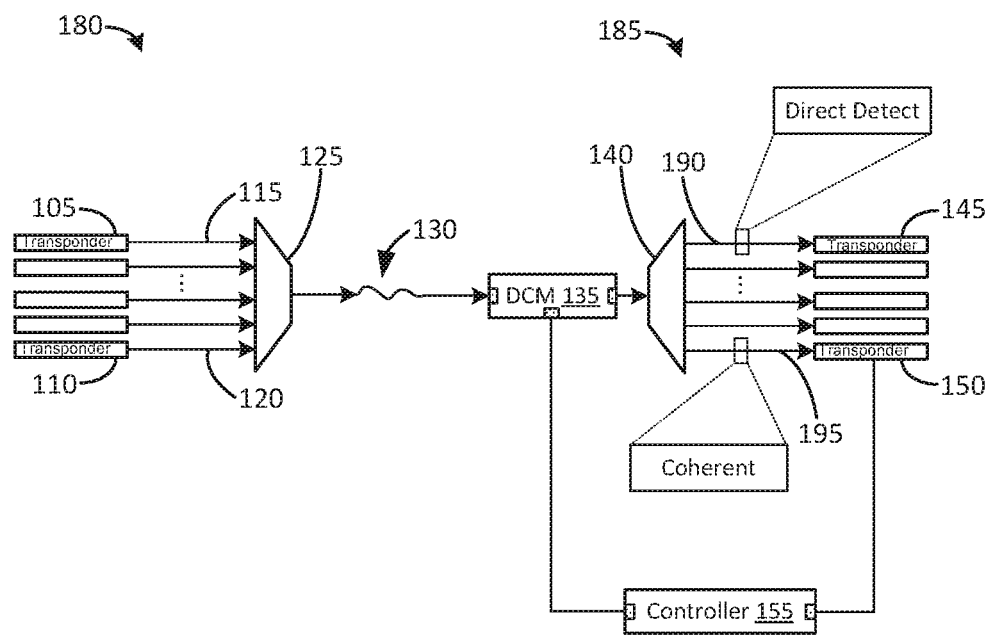
FIG. 1 illustrates an example of an optical fiber data communications system managing chromatic dispersion.

Some of the material described in this disclosure include systems and techniques for managing, or adjusting, chromatic dispersion of optical signals. In one example, an optical fiber data communications system can provide optical signals (e.g., light) to be analyzed via direct detection. In direct detection, the intensity of the optical signals can be determined to recover modulated information. However, characteristics regarding the optical signals, such as their chromatic dispersion, can be difficult to determine using direct detection. Therefore, the optical fiber data communications can also provide an optical signal to be detected using coherent detection. By contrast, in coherent detection, the modulated information is recovered using intensity, phase, and/or frequency of the optical signal. This can allow for characteristics of the optical signal, such as its chromatic dispersion, to be determined. The chromatic dispersion of the optical signal analyzed using coherent detection can then be extrapolated to the other optical signals that are to be analyzed using direct detection. A controller can then instruct a tunable dispersion compensation module (DCM) to provide some "negative" chromatic dispersion to account for the "positive" chromatic dispersion experienced by the optical signals as they propagate through the optical fiber. This can increase the data capacity of the optical fiber data communications system using direct detection.

In more detail, optical fiber data communications systems can include optical fibers as waveguides that can be used to provide communications using pulses of light as optical signals at different wavelengths, or optical channels. As the optical signals propagate through an optical fiber, they can experience chromatic dispersion. Chromatic dispersion is an optical phenomena in which the phase velocity of a wave depends on its frequency and material of the optical fiber carrying the wave (or optical signal), resulting in a temporal distortion. Other factors causing chromatic dispersion can also include the length of the optical fiber or the temperature. One effect of chromatic dispersion upon optical signals can be a degradation such as a broadening, or spreading, of pulses of the optical signals as they propagate through the optical fiber and, therefore, the difference between a "0" and a "1" can be difficult to ascertain. Thus, chromatic dispersion can cause an increase in data errors. If chromatic dispersion can be reduced or eliminated in an optical fiber data communications system, then the data capacity can be increased.

Optical fiber data communications system can also employ direct detection or coherent detection to extract information modulated using the optical signals. In direct detection, the intensity of the optical signals can be determined to recover the modulated information. That is, optical signals analyzed using direct detection are intensity modulated to encode information. In coherent detection, the intensity, the phase, and/or the frequency of the optical signal can be determined to recover the modulated information. For example, optical signals analyzed using coherent detection can use intensity, frequency, and/or phase modulation. An optical fiber data communications system implementing direct detection for optical signals can use lower power, have a smaller size, and have a reduced cost in comparison with coherent detection. However, chromatic dispersion can be difficult to determine and reduce using direct detection because direct detection is unable to determine phase information of the optical signals. By contrast, phase information of optical signals is determined using coherent detection and, therefore, the chromatic dispersion of an optical signal can be determined based on the phase information.

FIG. 1 illustrates an example of an optical fiber data communications system managing chromatic dispersion. The optical fiber data communications system in FIG. 1 can employ direct detection for many of the optical signals. However, coherent detection can be used for at least one optical signal. Because intensity, phase, and/or frequency of an optical signal can be determined using coherent detection, this information can be used to determine the chromatic dispersion of the optical signal analyzed using coherent detection. For example, a phase of the optical signal can be used to determine a phase shift and, therefore, chromatic dispersion. The chromatic dispersion of that optical signal can then be extrapolated to determine the chromatic dispersions of the other optical signals to be analyzed with direct detection. A tunable dispersion compensation module (DCM) can then be instructed to adjust the chromatic dispersions of the optical signals received from an optical fiber (e.g., modify the chromatic dispersions such that they are reduced or eliminated). Thus, the chromatic dispersion of an optical signal to be analyzed using direct detection can be accounted for using an optical signal analyzed using coherent detection. As a result, the data capacity of the optical fiber data communications system using direct detection in FIG. 1 can be increased.

For example, in FIG. 1, an optical fiber data communications system can include a transponder 105 (e.g., a direct detect PAM4 transponder) implementing direct detection and a transponder 110 (e.g., a coherent detect QOH transponder) implementing coherent detection on transmit-side 180. The other transponders on transmit-side 180 can also implement direct detection. The optical signals provided by the transmitters of transponders 105 and 110 (i.e., optical signals 115 and 120, respectively) as well as the other transponders can each be at a different wavelength and, therefore, represent different optical channels. Each of the optical signals can be provided to multiplexer 125 (e.g., an optical add-drop multiplexer (OADM)) which can multiplex the optical signals such that they are simultaneously transmitted via an optical fiber 130 to receive-side 185.

On receive-side 185, a tunable dispersion compensation module (DCM) 135 can receive the optical signals from the optical fiber 130. As discussed later herein, the tunable DCM 135 can be used to modify the chromatic dispersions of the optical signals received from the optical fiber 130. A demultiplexer 140 receives the optical signals from the tunable DCM 135 and splits the optical signals such that each is provided to a respective transponder. For example, the optical signal 115 can propagate through the optical fiber 130 and then provided to the transponder 145 (e.g., also a direct detect PAM4 transponder similar to the transponder 105) as optical signal 190 on the receive-side 185. The transponder 145 can employ direct detection to extract information from the optical signal 190 based on its intensity. However, due to chromatic dispersion, optical signal 190 on the receive-side 185 might be different than the optical signal 115 on the transmit-side 115. For example, as previously discussed, the optical signal 190 might be degraded in comparison with the optical signal 115.

The transponder 150 (e.g., also a coherent detect QOH transponder similar to the transponder 110) can employ coherent detection to extract modulated information from the optical signal 195 (i.e., the result of optical signal 120 propagating through the optical fiber 130) using the intensity, phase, and/or frequency of the optical signal 195 on receive-side 185. Because the transponder 150 can employ coherent detection, a variety of signal processing techniques can be used at the receiver of transponder 150 to determine characteristics of the optical signal 195. For example, the electric field, information regarding the quality of the optical signal 195, as well as the intensity, the phase, and the frequency can be determined. Some or all of this information regarding the characteristics of optical signal 195 can also be used to determine the chromatic dispersion of optical signal 195. For example, transponder 150 can determine the chromatic dispersion of the optical signal 195 using the phase of the optical signal 195, or information regarding the characteristics of the optical signal 195 can be provided to controller 155. Controller 155 can then determine or calculate the chromatic dispersion of the optical signal 195 using the characteristics. Controller 155 can be implemented with an application specific integrated circuit (ASIC), a field programmable gate array (FPGA) or other type of programmable logic device, a processor, a microcontroller, etc. The functionality of controller 155 might reside within a separate device (e.g., semiconductor chip), or some of the functionality can be split between controller 155 in FIG. 1 and transponder 150.

Using the chromatic dispersion of optical signal 195, the controller 155 can determine the chromatic dispersion of the other optical signals on the receive-side 185. For example, the chromatic dispersion of the optical signal 190 can be determined. This can be performed because the wavelengths of the optical signals can be relatively close (e.g., in a narrow band of wavelengths such as within the C band between 1530 to 1565 nanometer (nm) wavelengths) and, therefore, the chromatic dispersion of other optical signals can be based on a variety of mathematical models (e.g., the Sellmeier equation for determining chromatic dispersion can be used to extrapolate chromatic dispersions of the other signals by a range of values along a curve) that can estimate or extrapolate the chromatic dispersions of the optical signals to be analyzed using direct detection (e.g., the optical signal 190).

Based on the chromatic dispersions determined for each of the optical signals at the receive-side 185, the controller 155 can provide chromatic dispersion adjustment data to the tunable DCM 135 to modify the chromatic dispersion of the optical signals following their propagation within the optical fiber 130. For example, the tunable DCM 135 can be a fiber Bragg grading in which fiber within the tunable DCM 135 is stretched or contracted to modify the chromatic dispersion of an optical signal. All of the optical signals received from the optical fiber 130 can have their chromatic dispersion modified the same, groups of optical signals might have their chromatic dispersions modified differently (e.g., a set of five optical signals might have their chromatic dispersions modified differently than another set of five optical signals), or each of the optical signals can have a different modification or adjustment for their corresponding chromatic dispersions.

In another example, the tunable DCM 135 can be an etalon cavity and its spacing can be changed to adjust the chromatic dispersions of optical signals. The chromatic dispersion adjustment data provided by the controller 155 can indicate the changes to be performed by the tunable DCM 135 (e.g., how much tunable DCM 135 should stretch the fiber of the fiber Bragg grading, etc.), or the chromatic dispersion adjustment data can indicate the chromatic dispersions of the optical signals and the tunable DCM 135 can determine how to change its own characteristics to adjust the chromatic dispersions accordingly.

When the tunable DCM 135 adjusts the chromatic dispersions of the optical signals, this results in the chromatic dispersion of the optical signal 195 to be reduced, for example, reversed or eliminated. That is, the tunable DCM 135 can provide a "negative" chromatic dispersion to account for (e.g., reduce or eliminate) the chromatic dispersion caused by the optical fiber 130. As a result, the optical signals to be analyzed using direct detection, such as the optical signal 190 in the receive-side 185 based off of the optical signal the 115 in the transmit-side 180, can also have their chromatic dispersions reduced. Thus, the optical signals to be analyzed using direct detection (e.g., optical signals that are intensity modulated) can have their chromatic dispersions reduced by analyzing the chromatic dispersion of the optical signal 195 analyzed using coherent detection. Using these techniques, the optical fiber data communications system of FIG. 1 can implement direct detection for many optical signals and, therefore, use lower power, have a smaller size, and have a reduced cost than a fully coherent detection system.

Figure 2:
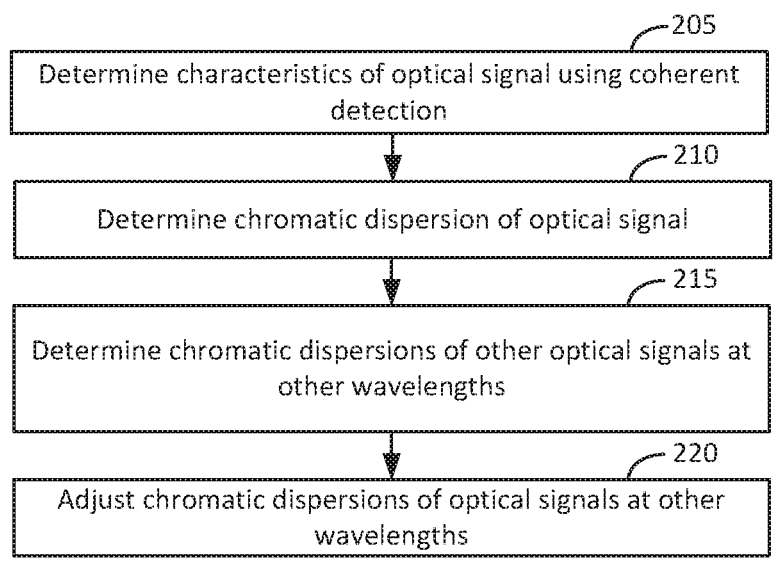
FIG. 2 illustrates an example of a block diagram for managing chromatic dispersion.
Figure 3A:
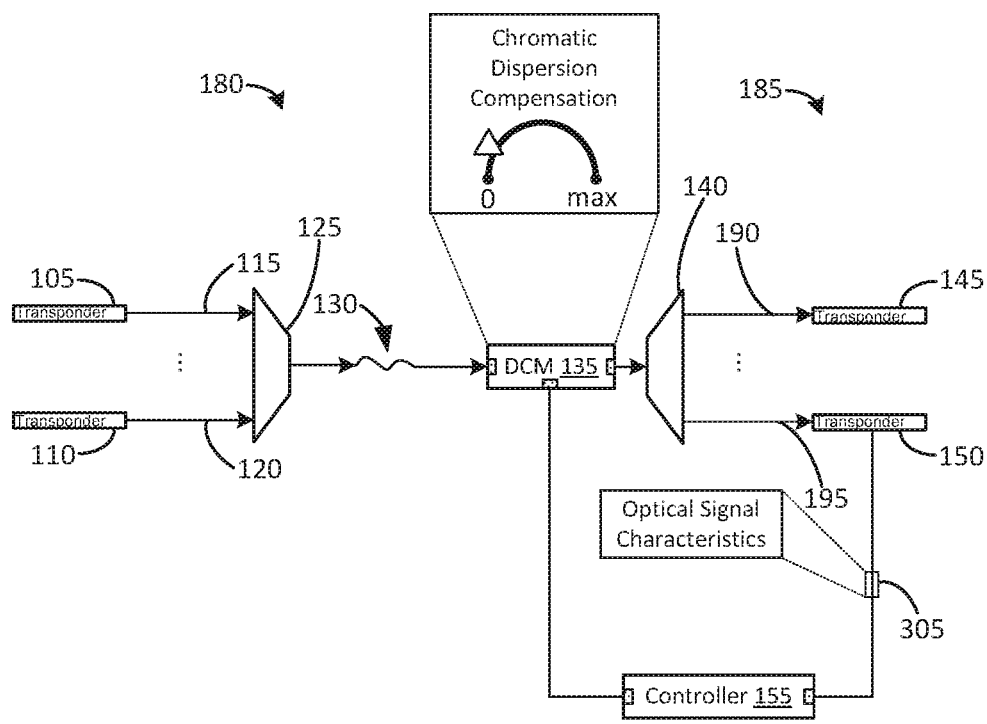
FIGS. 3A and 3B illustrate another example of an optical fiber data communications system managing chromatic dispersion.
Figure 3B:
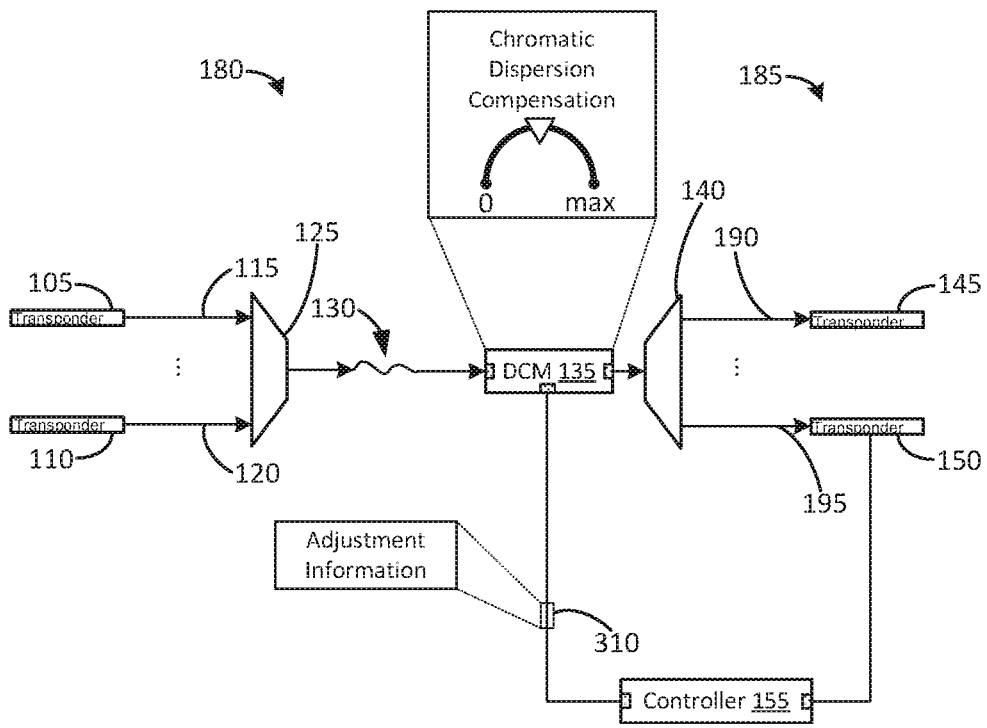

FIG. 2 illustrates an example of a block diagram for managing chromatic dispersion. FIGS. 3A and 3B illustrate another example of an optical fiber data communications system managing chromatic dispersion. In FIG. 2, characteristics of an optical signal can be determined using coherent detection (205). For example, in FIG. 3A, the optical signal 195 can be received by the transponder 150 using coherent detection. As previously discussed with reference to FIG. 1, coherent detection transponders can measure a variety of characteristics of optical signals such as electric field, quality of the optical signal, phase of the optical signal, frequency of the optical signal, and/or intensity of the optical signal. Thus, the optical signal characteristics 305 can be provided to the controller 155. In some implementations, the optical signal characteristics 305 can indicate the chromatic dispersion of optical signal 195. Returning to FIG. 2, the chromatic dispersion of the optical signal can be determined (210). For example, the chromatic dispersion of the optical signal 195 can be determined using the optical characteristics 305 (e.g., information related to the phase of the optical signal 195).

Next, the chromatic dispersions of other optical signals at other wavelengths, or optical channels, can be determined (215). For example, in FIG. 3A, the chromatic dispersion of the optical signal 190 can be determined. As previously discussed regarding FIG. 1, the optical signal 190 can be analyzed using direct detection via the transponder 145 rather than coherent detection. Because direct detection cannot determine phase information of an optical signal, the chromatic dispersion of the optical signal 190 can be determined or estimated based on the chromatic dispersion of the optical signal 195 (i.e., an optical signal that is analyzed using coherent detection). That is, the chromatic dispersions of other optical signals at other wavelengths to be analyzed by transponders using direct detection can be estimated based on the chromatic dispersion of the optical signal 195 analyzed using a transponder employing coherent detection.

The chromatic dispersions of the optical signals at the other wavelengths can then be adjusted (220). For example, in FIG. 3B, the chromatic dispersion adjustment information 310 can be determined by the controller 155 and provided to the tunable DCM 135 to adjust the chromatic dispersion of the optical signals such as the optical signal 190 at the receive-side 185. As portrayed in FIGS. 3A and 3B, this results in the chromatic dispersion compensation provided by the tunable DCM 135 to increase, for example, to reduce or eliminate the chromatic dispersion of the optical signals of receive-side 185 by providing a chromatic dispersion adjustment. That is, the tunable DCM 135 can provide some "negative" chromatic dispersion to account for the "positive" chromatic dispersion caused by the optical signals propagating through the optical fiber 130. Thus, in one example, the optical signal 190 can have its chromatic dispersion reduced while still being analyzed using direct detection to extract modulated information (e.g., intensity modulation).

Chromatic dispersion can be managed in other ways. For example, some optical fiber data communications systems can use direct detection but still employ an optical supervisory channel for maintenance purposes. An optical supervisory channel can include information regarding the user-oriented optical signals, information regarding remote conditions at the sites of the optical fiber data communications systems, software upgrades, etc.

Figure 4:
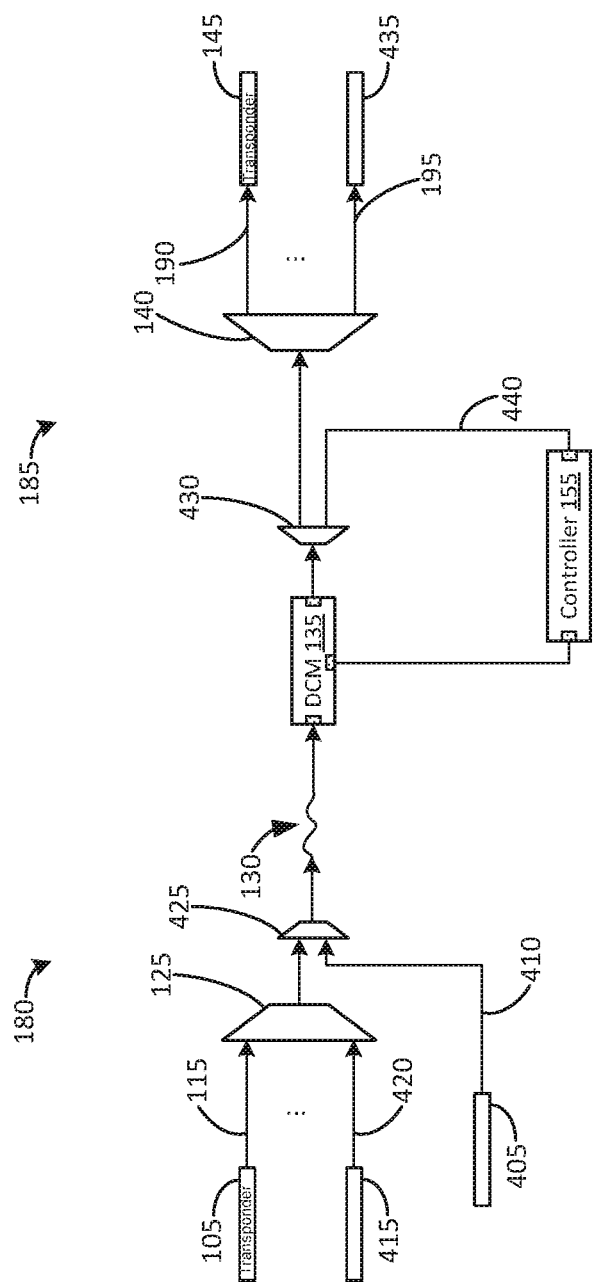
FIG. 4 illustrates an example of an optical fiber data communications system managing chromatic dispersion using an optical supervisory channel.

FIG. 4 illustrates an example of an optical fiber data communications system managing chromatic dispersion using an optical supervisory channel. In FIG. 4, an optical supervisory channel 410 provided by a coherent detection transponder 405 can be an optical channel outside of the band carrying user-oriented optical signals such as optical signals 115 and 420 in FIG. 4. For example, the optical signals 115 and 420 provided by direct detection transponders 105 and 415, respectively, in FIG. 4 can operate within the C (or conventional) band (e.g., 1530 to 1565 nanometer (nm) wavelengths) while the optical supervisory channel 410 can be provided by the coherent detection transponder 405 outside of the C band (e.g., at 1510 nm).

In FIG. 4, the optical signals 115, 420, and the optical supervisory channel 410 can be multiplexed via multiplexers 125 and 425 and transmitted via the optical fiber 130. A demultiplexer 430 can extract the optical supervisory channel 440 on the receive-side 185. Characteristics of the optical supervisory channel 440 can be determined similar to FIGS. 1-3B regarding the optical signal 195 and the controller 155 can provide chromatic dispersion adjustment information to tunable DCM 135 in a similar manner. For example, because the optical supervisory channel 440 can be analyzed using coherent detection, the chromatic dispersion that it experiences can be determined and used to determine the chromatic dispersion of the other optical signals to be analyzed via direct detection using the transponders 145 and 435 on the receive-side 185. Thus, the controller 155 in FIG. 4 can provide chromatic dispersion adjustment information to the tunable DCM 135 to adjust the chromatic dispersion of optical signals received from the optical fiber 130.

Embodiments of the subject matter and the operations described in this specification can be implemented in analog and/or digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A non-transitory computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium also can be, or can be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. An optical fiber data communications system, comprising:
    a chromatic dispersion determining circuit configured to determine chromatic dispersion of a first optical signal to be demodulated using direct detection, the determination of the chromatic dispersion of the first optical signal based on information indicative of chromatic dispersion of a second optical signal to be demodulated using coherent detection, wherein the chromatic dispersion determining circuit is configured to determine phase information of the second optical signal and further configured to determine the information indicative of chromatic dispersion of the second optical signal based on the determined phase information; and
    a chromatic dispersion reversing module configured to apply a chromatic dispersion adjustment to adjust the chromatic dispersion of the first optical signal based on the determination of the chromatic dispersion of the first optical signal, wherein the chromatic dispersion reversing module is further configured to determine the chromatic dispersion adjustment that reverses at least a portion of the chromatic dispersion of the first optical signal.

2. The optical fiber data communications system of claim 1, wherein the first optical signal provides information based on intensity modulation, and the second optical signal provides information based on phase modulation.

3. The optical fiber data communications system of claim 1, wherein the information indicative of the chromatic dispersion of the second optical signal is a phase of the second optical signal.

4. The optical fiber data communications system of claim 1, wherein the chromatic dispersion adjustment applied to the first optical signal is based on chromatic dispersion associated with an optical fiber that the first optical signal and the second optical signal propagate through.

5. The optical fiber data communications system of claim 1, wherein determining the chromatic dispersion of the first optical signal is based on extrapolating the chromatic dispersion of the second optical signal to the first optical signal, the first optical signal and the second optical signal being at different wavelengths.

6. The optical fiber data communications system of claim 1, further comprising:
    a first transponder to receive the first optical signal and configured to demodulate the first optical signal using direct detection; and
    a second transponder to receive the second optical signal and configured to demodulate the second optical signal using coherent detection.

7. The optical fiber data communications system of claim 6, wherein the information indicative of chromatic dispersion of the second optical signal is based on a phase of the second optical signal determined using coherent detection.

8. An optical fiber data communications system managing chromatic dispersion configured to determine characteristics of a first optical signal corresponding with coherent detection, and configured to reverse at least a portion of dispersion of a second optical signal corresponding with direct detection based on the characteristics of the first optical signal corresponding with coherent detection.

9. The optical fiber data communications system managing chromatic dispersion of claim 8, wherein the characteristics of the first optical signal include dispersion of the first optical signal.

10. The optical fiber data communications system managing chromatic dispersion of claim 8, wherein the characteristics of the first optical signal include a phase of the first optical signal.

11. The optical fiber data communications system managing chromatic dispersion of claim 8, wherein the first optical signal provides information based on phase modulation, and the second optical signal provides information based on intensity modulation.

12. The optical fiber data communications system managing chromatic dispersion of claim 8, wherein the characteristics of the first optical signal are indicative of dispersion of the first optical signal.

13. The optical fiber data communications system managing chromatic dispersion of claim 12, further configured to determine dispersion of the second optical signal based on the characteristics of the first optical signal that are indicative of the dispersion of the first optical signal.

14. The optical fiber data communications system managing chromatic dispersion of claim 13, wherein the dispersion of the second optical signal is determined based on an extrapolation of the dispersion of the first optical signal.

15. The optical fiber data communications system managing chromatic dispersion of claim 8, wherein the first optical signal and the second optical signal are at different wavelengths.

16. A method, comprising:
  determining characteristics of a first optical signal corresponding to coherent detection;
  determining chromatic dispersion of a second optical signal corresponding to direct detection based on the characteristics of the first optical signal; and
  reversing at least a portion of the chromatic dispersion of the second optical signal based on the determination of the chromatic dispersion of the second optical signal.

17. The method of claim 16, wherein the characteristics of the first optical signal are indicative of chromatic dispersion of the first optical signal.

18. The method of claim 16, wherein the characteristics of the first optical signal include a phase of the first optical signal.

19. The method of claim 16, wherein the chromatic dispersion of the second optical signal is adjusted to account for chromatic dispersion experienced by the second optical signal as it propagated through an optical fiber.

20. The method of claim 16, wherein the first optical signal provides information based on phase modulation, and the second optical signal provides information based on intensity modulation.

* * * * *